United States Patent [19]

Kawabata et al.

[11] Patent Number: 5,237,643
[45] Date of Patent: Aug. 17, 1993

[54] PARALLEL PROCESSING INFERENCE SYSTEM WITH SINGLE INFERENCE ENGINE

[75] Inventors: Hirokazu Kawabata; Takashi Yutani, both of Hyogo, Japan

[73] Assignee: Mitsubishi Denki Kabushiki Kaisha, Japan

[21] Appl. No.: 656,779

[22] Filed: Feb. 15, 1991

[30] Foreign Application Priority Data

May 22, 1990 [JP] Japan ............................. 2-133518

[51] Int. Cl.$^5$ .......................... G06F 15/18; G06F 7/00
[52] U.S. Cl. ......................................... 395/51; 395/11
[58] Field of Search .................. 395/52, 51, 920, 906, 395/907, 62, 11

[56] References Cited

U.S. PATENT DOCUMENTS

| 4,885,705 | 12/1989 | Choi | 364/525 |
| 4,953,147 | 8/1990 | Cobb | 367/35 |
| 4,970,658 | 11/1990 | Durbin et al. | 364/513 |

OTHER PUBLICATIONS

Barr et al., The Handbook of Artificial Intelligence vol. I, Addison-Wesley Pub., 1981, pp. 190-199.
Oflazer, K., "Partitioning in Parallel Processing of Production Systems", Intl. Conf. Parallel processing, 1984, pp. 92-100.
Charniak et al., Artificial Intelligence Programming 2nd ed., Lawrence Erlbaum Pub., 1987, pp. 248-275.
Rao et al., "An Expert System for Chemical Process Control: A Case Study", Western Conf. on Expert Systems, Jun. 1987, 216-222.
Brownston et al., Programming Expert Systems in OPS5, Addison-Wesley Pub., 1985, pp. 3-206.

Primary Examiner—Michael R. Fleming
Assistant Examiner—Robert W. Downs
Attorney, Agent, or Firm—Wolf, Greenfield & Sacks

[57] ABSTRACT

An inference system comprising: a knowledge base defined as a set of rules described for a multiplicity of inference objects of one kind; a working memory storage unit including a region for temporarily storing an intermediate hypothesis to be modified and executed based on rules of the knowledge base for each individual inference object; a working memory selecting unit for performing reading and writing by selecting only the objective working memory from the working memory unit; a parameter storage unit containing parameters provided for respective objects, each parameter being needed when applying the rule of the knowledge base; a parameter selecting unit for reading only the objective parameter for the parameter storage unit; and an inference engine for applying the rule corresponding to contents of the objective working memory from the rules of the knowledge base for one inference object by manipulating the working memory selecting unit and the parameter selecting unit as well.

19 Claims, 4 Drawing Sheets

PARALLEL PROCESSING INFERENCE SYSTEM WITH SINGLE INFERENCE ENGINE

BACKGROUND OF THE INVENTION

The present invention is directed to an inference system applied to plant control.

FIG. 4 is a block diagram illustrating a configuration of a conventional production system reported, e.g., on p. 49 of [Expert System Introduction Actual Practice Guide] (Oct. 4, 1988), published by Denki Shoin.

The production system includes a knowledge base unit 1 for storing a knowledge base defined as a set of rules. Connected to the knowledge base unit 1 is a working memory 2 conceived as a region for temporarily storing an intermediate hypothesis to be modified (the modification implies rewriting and adding) and executed on the rules of the knowledge base. Connected to the knowledge base unit 1 and the working memory 2 is an inference engine 3 for applying the rules in accordance with contents of the working memory 2 from the rules of the knowledge base.

The following is a description of the operation.

A rule employed for the inference is selected from those stored in the knowledge base unit 1.

In the production system, the working memory 2 for temporarily storing the intermediate hypothesis obtained in the course of inference exhibits a present status.

The contents of the working memory 2 are matched with conditions written to a condition part of the rule stored in the knowledge base unit 1. If all the conditions coincide with the contents of the working memory 2, the rule is selected as an applicable one.

If a plurality of rules is selected, one of these rules is further selected.

The one rule selected therefrom is fired, and then a procedure written to an action part is executed.

The contents of the working memory 2 are thus rewritable.

Thereafter, this cycle is repeated. When no single piece of applicable rule is left, or when executing a termination command written to the action part of the fired rule, the inference comes to an end.

The conventional inference system is configured in the way described above. Where the number of objects for inference is 1, the system is effective. In the case of plant control to which the system is actually applied, there exists a multiplicity (several hundreds or even several thousands) of motors or valves of one kind as objects. For this reason, if the system is applied directly to the plant control, the configuration is exemplified by FIG. 5. The knowledge base unit 1 and the working memories 2 remarkably increase in quantity. This requires the use of a large amount of computer memory. Besides, during an execution of inference of one object, the inference of other remaining objects is not allowed to be executed till matching with all the rules of the knowledge base is finished. The plant control under which on-line inference is required presents such a problem that a detection of fault is delayed.

Accordingly, it is an object of the present invention, which has been devised to obviate the foregoing problems, to provide an inference system capable of effecting on-line inference of all objects without causing any delay of a fault detection.

SUMMARY OF THE INVENTION

To accomplish the above-mentioned object, according to one aspect of the invention, there is provided an inference system comprising: a knowledge base defined as a set of rules described for a multiplicity of inference objects of one kind; a working memory storage unit including a region (working memory) for temporarily storing an intermediate hypothesis to be modified and executed based on rules of the knowledge base for each individual inference object; a working memory selecting unit for performing reading and writing by selecting only the objective working memory from the working memory unit; a parameter storage unit containing parameters provided for respective objects, each parameter being needed when applying the rule of the knowledge base; a parameter selecting unit for reading only the objective parameter for the parameter storage unit; and an inference engine for applying the rule corresponding to contents of the objective working memory from the rules of the knowledge base for one inference object by manipulating the working memory selecting unit and the parameter selecting unit as well.

In the inference system according to the present invention, the working memory selecting unit effects the reading and writing by selecting only the objective working memory from the working memory storage unit. The parameter selecting unit reads only the objective parameter from the parameter storage unit containing the parameters provided for the respective objects and needed when applying the rules of the knowledge base. The inference engine applies the rule corresponding to the contents of the objective working memory for one inference object by manipulating both the working memory selecting unit and the parameter selecting unit.

BRIEF DESCRIPTION OF THE DRAWINGS

Other objects and advantages of this invention will become apparent during the following discussion taken in conjunction with the accompanying drawings, in which.

Note that the same symbols indicate the like or corresponding components in the Figures.

DETAILED DESCRIPTION OF THE PREFERRED EMBODIMENT

One embodiment of this invention will hereinafter be described with reference to the accompanying drawings.

Figure 1:
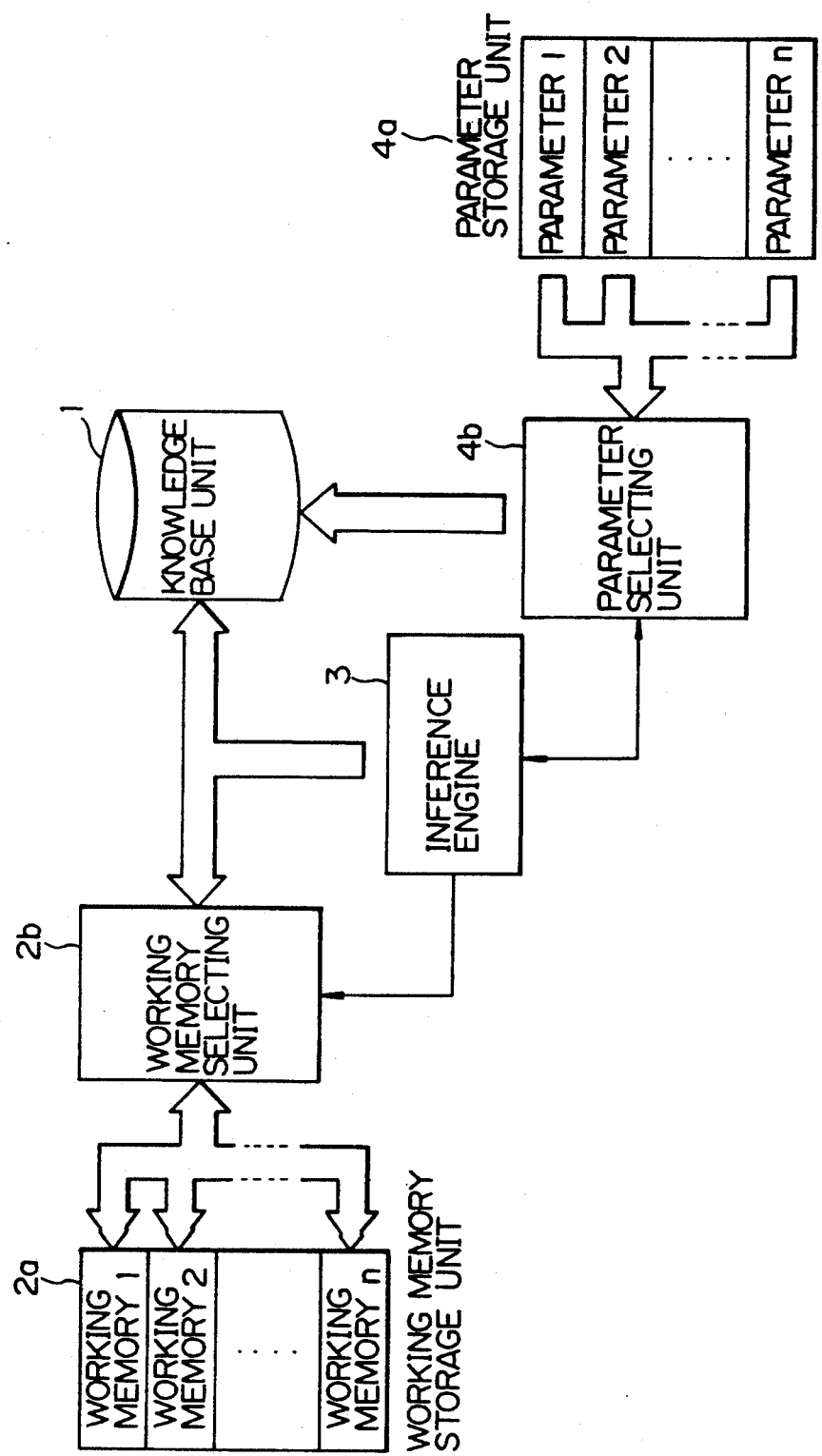
FIG. 1 is a block diagram illustrating a configuration of an inference system in one embodiment of the present invention.

Referring to FIG. 1, an inference system of this invention includes a knowledge base unit 1. The knowledge base unit 1 stores a knowledge base consisting of a set of rules wherein diagnostic contents of a multiplicity of inference objects of one kind are expressed based on production rules in, e.g., an IF-THEN form. Connected to the knowledge base unit 1 is a working memory selecting unit 2b for effecting reading and writing by selecting only a working memory of the present inference object for use when the present inference object is modified and executed based on the rule of the knowledge base.

A working memory storage unit 2a is defined as an aggregation of working memories. Prepared in this working memory per inference object is a region for temporarily storing each intermediate hypothesis to be modified and executed on the rule of the knowledge base with an advancement of inference of each of the multiplicity of inference objects.

The inference system of this invention further includes a parameter storage unit 4a conceived as an aggregation of storage regions, prepared per inference object, for storing a variety of attribute values of the respective inference objects. These attribute values are required when applying the rules of the knowledge base unit 1 to the multiplicity of inference objects. A parameter selecting unit 4b is connected to the parameter storage unit 4a. The parameter selecting unit 4b prepares a knowledge base corresponding to a new inference object by selectively reading only the parameter of a new inference object whenever the present inference object is replaced and further substituting these parameters into a group of rules of the knowledge base unit 1.

An inference engine 3 is connected to the knowledge base unit 1, the working memory selecting unit 2b and the parameter selecting unit 4b. The inference engine 3 applies the rule from the knowledge base in accordance with the contents of the objective working memory of the present inference object of the working memory selecting unit 2b. This application process is carried out by preparing the new knowledge base corresponding to the present inference object from the parameter storage unit 4a and the knowledge base unit 1 and further by manipulating the working memory selecting unit 2b.

Figure 2:
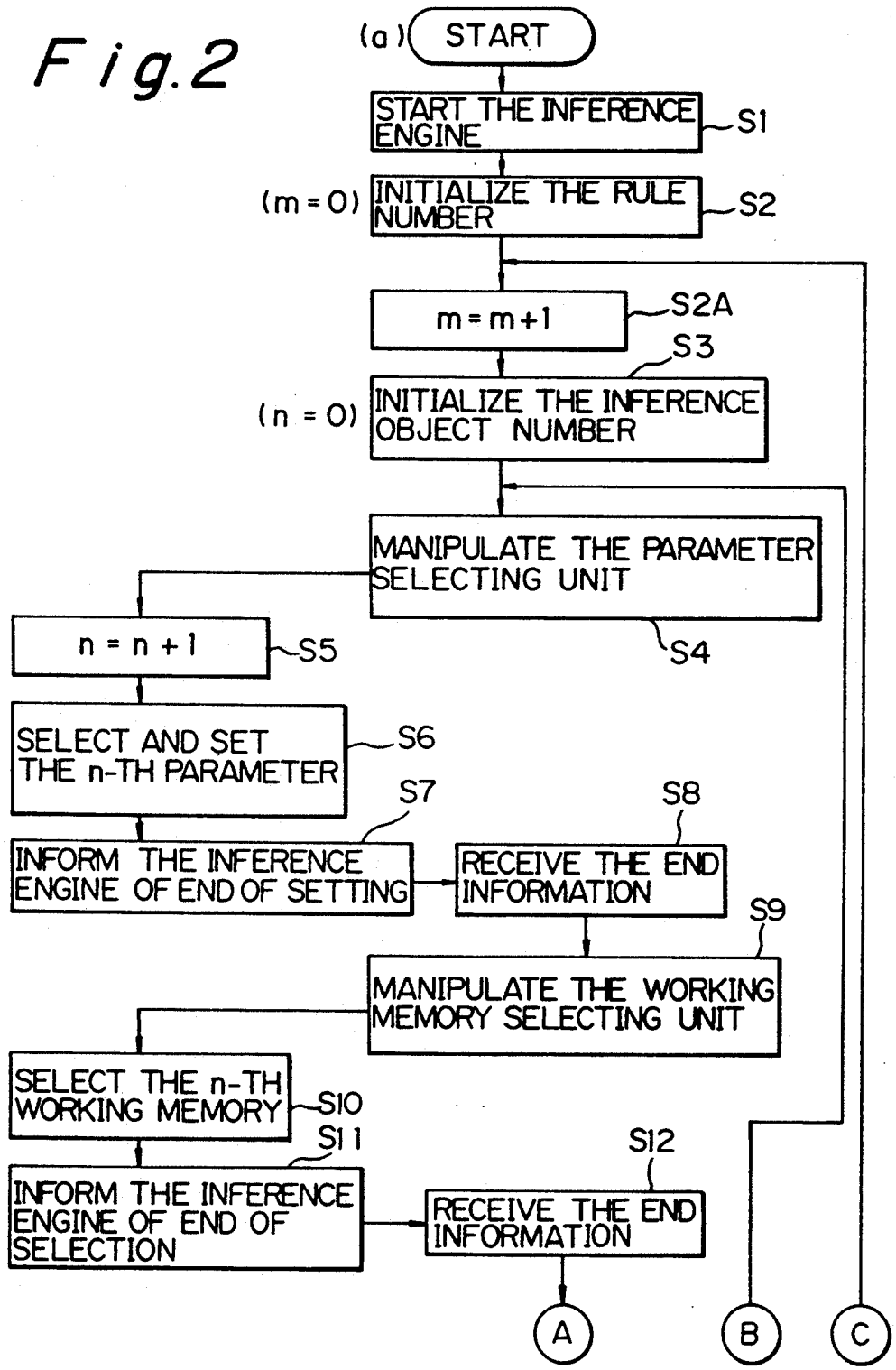
FIGS. 2 and 3 are flowcharts each showing the action of this invention.
Figure 3:
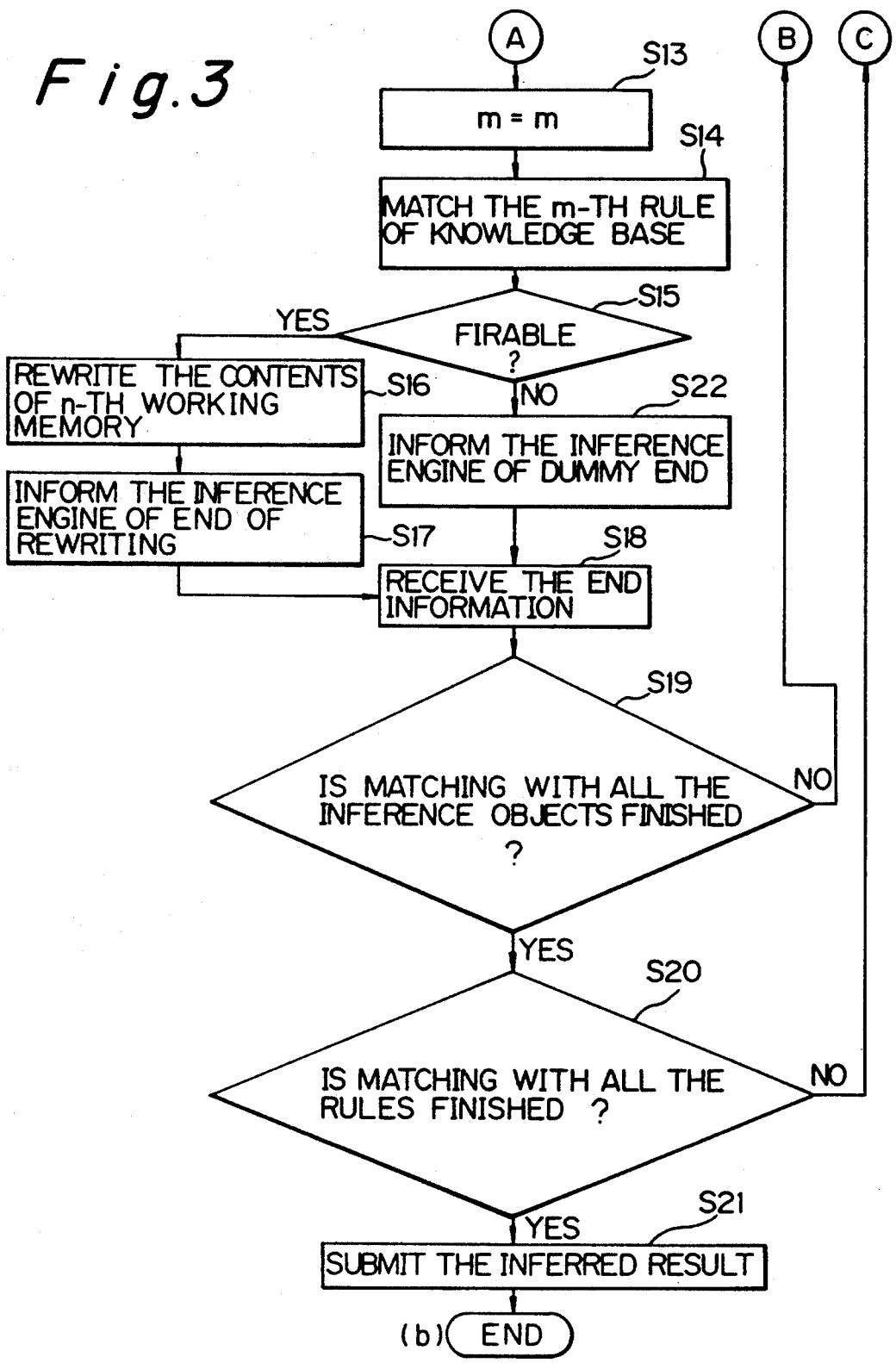
Figure 4:
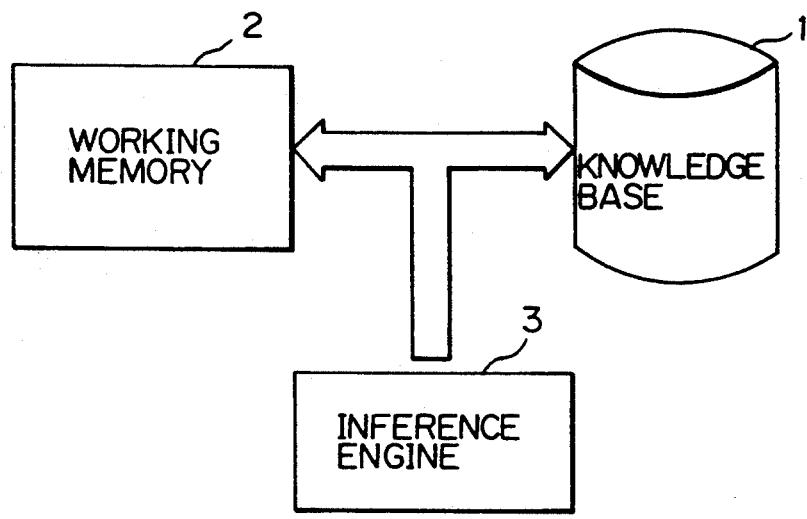
FIG. 4 is a block diagram depicting a configuration of a prior art production system.
Figure 5:
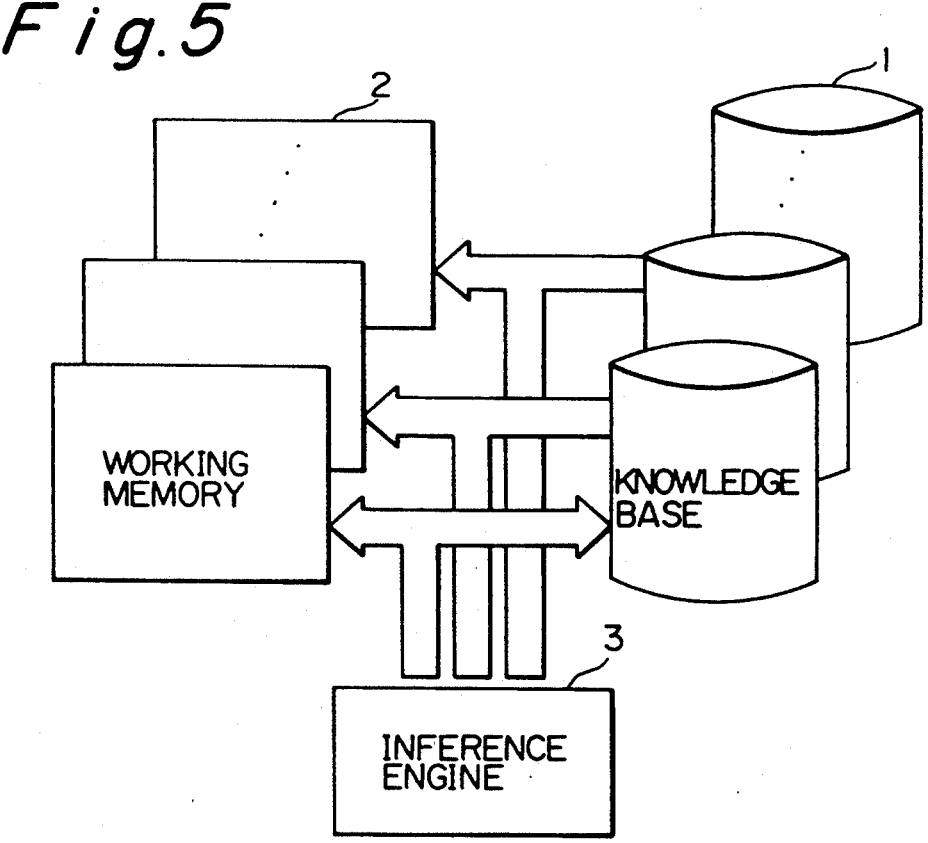
FIG. 5 is a diagram showing a case where the prior art production system is applied to a system having a multiplicity of inference objects.

The operation of this embodiment will be explained in conjunction with flowcharts of FIGS. 2 and 3.

For simplicity of the description, it is assumed that the inference engine 3 is still in an unexecuted status of inference. It is also assumed that the parameter selecting unit 4b and the working memory selecting unit 2b which do not yet work are in a status where setting of initial values has been finished (a status before starting the operation).

When the user at first starts the inference engine 3 (step S1), the inference engine 3 gives instructions to initialize a rule number (step S2), makes an increment (step S2A) and initializes an inference object number (step S3). The inference engine 3 then informs the parameter selecting unit 4b to load the parameter (step S4).

The parameter selecting unit 4b reads a variety of attribute values of the first inference object from a parameter 1 of the parameter storage unit 4a (step S5). These attribute values are set in the knowledge base unit 1 (step S6). The parameter selecting unit 4b prepares a knowledge base corresponding to the first inference object and informs the inference engine 3 of an end of the preparation thereof (step S7).

Subsequently, the inference engine 3, after receiving the end information (step S8), notifies the working memory selecting unit 2b to select a working memory (step S9).

Based on this notification, the working memory selecting unit 2b selects a working memory 1 for the first inference object from the working memory storage unit 2a (step S10). The inference engine 3 is informed of the selection being finished (step S11). With this arrangement, the inference system for the first inference object is configured.

On receiving the end information thereof (step S12), the inference engine 3 starts a matching process from the first rule among the rules stored in the knowledge base unit 1 (steps S13, S14).

If the matched result is applicable, the rule is fired (step S15). This consequence of execution is written by the working memory selecting unit 2b to a storage region of a working memory 1 of the working memory storage unit 2a. After finishing the writing process (step S16), the working memory selecting unit 2b informs the inference engine 3 of the end of this process (step S17).

When receiving the write end information (step S18), the inference engine 3 judges whether or not matching of the first rule of the knowledge base unit 1 is performed with respect to all the inference objects (step S19).

If matching of the first rule of the knowledge base unit 1 is not yet finished with respect to all the inference objects, the action returns to the preceding step S4 for matching with the next group of inference objects. The matching process with the next group of inference objects is repeatedly performed in the same procedures as the above.

If matching of the first rule of the knowledge base unit 1 is finished with respect to all the inference objects, whether the matching processes of all the rules are finished or not is judged (step S20). If not, the rule to be matched is updated next (step S2A). To start matching with the first inference object, the matching process is repeatedly carried out in the same procedures as the above, passing through the above-mentioned step S3.

These procedures are repeated, and it follows that the matching processes of all the rules of the knowledge base unit 1 with all the inference objects are completed. Inference results with respect to the multiplicity of inference objects are thereby obtained (step S21).

At the step S15, if the inferred result is not applicable, the inference engine 3 is informed of a dummy end (step S22).

Note that the working memory selecting unit 2b can be divided into a working memory information management unit and a working memory access unit. The working memory information management unit transfers and receives the information to and from the inference engine 3 and selects the working memory. The working memory access unit reads and writes the information from and to the working memory.

It is also possible to divide the parameter selecting unit 4b into a parameter information management unit and a knowledge base preparation unit. The parameter information management unit transfers and receives the information to and from the inference engine 3 and further selects the parameters. The knowledge base preparation unit prepares a knowledge base corresponding to the inference object by use of the selected parameters.

Besides, a function of the parameter selecting unit 4b may be limited to the parameter information management unit. The knowledge base unit 1 may incorporate the knowledge base preparation unit. The inference engine 3 may be dividable into an inference engine execution unit for actually effecting the inference and an inference engine management unit for transferring and receiving the information to and from the working memory selecting unit 2b and the parameter selecting unit 4b.

Incidentally, in the embodiment discussed above, after finishing the matching process of the condition part of the rule with each of the inference objects, the procedure is, if firable, immediately executed by the action part. The operation is not limited to this. Only the matching process of the condition part is effected in advance. The matching results are stored as firable flags into the inference engine 3 or the parameter storage unit 4a. After finishing the matching process of one rule with all the inference objects, the firable flag data are sequentially read out. For the firable inference objects, the previously matched rule is fired by manipulating the working memory storage unit 2a and the parameter selecting unit 4b. Only one or a plurality of rules among the rules having the firable flags are fired in accordance with the predetermined conditions (the same operation as the conventional conflict resolution is performed). A series of operations shown in the flowcharts of FIGS. 2 and 3 may be repeated till stop conditions are established.

The way of storing the rules of the knowledge base unit 1 is based on a hierarchical structure in which a set of rules (rule group) are classified according to the categories, and the inferred result obtained by one rule group prescribes a linkage with the next rule group. Based on this structure, the information on the group and name of the rule to be matched is given to the inference engine 3 or the parameter storage unit 4a. When the inference advances, the group/name information of the rule to be matched at the present time is read with respect to the individual inference objects. With this arrangement, it is possible to correspond to such a situation that the rule groups to be matched with the individual inference objects differ. In consequence, more detailed and adequate inferred results can be obtained with respect to the respective inference objects.

As discussed above, the present invention exhibits the following effects. One rule of the knowledge base is matched by selecting the working memory and the knowledge base for each of the multiplicity of the inference objects existing therein. It is feasible to prevent a futility of the memories of the computer for the inference of the multiplicity of the inference objects of one kind in the plant. In addition, while inferring one inference object, the parallel on-line inference of the multiplicity of inference objects can be executed without sacrificing the execution of inference of other remaining inference objects.

Although the embodiment of the present invention has been described in detail with reference to the accompanying drawings, it is to be understood that the present invention is not limited to that embodiment. Various changes or modifications may be effected therein by one skilled in the art without departing from the scope or spirit of the invention.

What is claimed is:

1. An inference system comprising:
    a knowledge base defined as a set of rules described for a multiplicity of inference objects of one kind, each inference object described by at least one rule;
    a working memory storage unit including a working memory region for each inference object, said working memory region temporarily storing an intermediate hypothesis to be modified and executed based on said knowledge base;
    a working memory selecting unit for performing reading and writing by selecting only the working memory region of a first of the inference objects;
    a parameter storage unit containing parameters provided for respective inference objects, each parameter being needed when applying the rule of said knowledge base;
    a parameter selecting unit for selectively reading only the parameters for said first inference object from said parameter storage unit; and
    an inference engine for applying a first rule of said knowledge base in accordance with the contents of said first working memory region by manipulating said working memory selecting unit and said parameter selecting unit,
    said inference engine further manipulating the working memory selecting unit and parameter selecting unit so that the first rule is applied to each of the remaining inference objects thereby enabling the parallel inference for all inference objects to be executed prior to application of a second rule to the first inference object by the inference engine.

2. The inference system as set forth in claim 1, wherein said parameter selecting unit is connected between said parameter storage unit and said knowledge base.

3. The inference system as set forth in claim 1, wherein said working memory selecting unit is connected between said working memory storage unit and said knowledge base.

4. The inference system as set forth in claim 1, wherein said parameter selecting unit connected to said inference engine works in accordance with a command from said inference engine.

5. The inference system as set forth in claim 1, wherein said working memory selecting unit connected to said inference engine works in accordance with a command from said inference engine.

6. The inference system as set forth in claim 1, wherein said working memory selecting unit is composed of a working memory information management unit for transferring and receiving information to and from said inference engine and for selecting said working memory storage unit and said working memory selecting unit further comprising a working memory access unit for reading and writing from and to said working memory storage unit.

7. The inference system as set forth in claim 1, wherein said parameter selecting unit is composed of a parameter information management unit for transferring and receiving information to and from said inference engine and for selecting the parameters, said parameter selecting unit further comprising a knowledge base preparation unit for preparing a knowledge base corresponding to the inference object by use of the selected parameters.

8. The inference system as set forth in claim 1, wherein said parameter selecting unit transfers and receives information to and from said inference engine and selects parameters, and wherein said knowledge base includes a knowledge base preparation unit for preparing the knowledge base corresponding to the inference object by use of the selected parameters.

9. The inference system as set forth in claim 1, wherein said inference engine is composed of an inference action part for executing an inference process and an inference engine management part for transferring and receiving information to and from said working memory selecting unit and said parameter selecting unit.

10. The inference system as set forth in claim 1 wherein the rules of said knowledge base are stored with a hierarchical structure in which the rules are arranged in groups classified according to a plurality of categories so that an inference result obtained by applying one rule group prescribes a linkage with the next rule group.

11. An inference method on a computer system comprising a single inference engine, a knowledge base defined as a set of rules described for a multiplicity of inference objects of one kind, and parameters prepared for the individual inference objects and required when applying a rule of said knowledge base, each of the inference objects described by at least one rule, and a working memory prepared for the individual inference objects for storing intermediate hypotheses, the inference method comprising the steps of:

(a) selecting an inference object;
(b) selecting the parameters for the selected inference object;
(c) reading an intermediate hypothesis from the working memory for the selected inference object;
(d) selecting a rule from the knowledge base according to the intermediate hypothesis read from the working memory of the selected inference object;
(e) executing with said single inference engine the inference process on the selected inference object by judging whether the rule is fireable while matching the rule by use of the selected parameters;
(f) storing any intermediate hypothesis in the working memory for the selected inference object;
(g) repeating the steps (b), (c), (d), (e) and (f) for all the inference objects so as to execute a parallel inference for all inference objects with said single inference engine.

12. The inference processing method as set forth in claim 11, wherein the step (e) includes one of the substeps of performing, if fireable, a modification and execution on the inference object at that time, and finishing, whereas if unfireable, the inference process.

13. The inference processing method as set forth in claim 11, wherein step (e) includes a substep of storing, if fireable, fireable flags for the inference object at that time, and wherein step (f) includes a substep of effecting modification and execution on the fireable inference object.

14. The inference processing method as set forth in claim 11, wherein step (e) includes a substep of storing, if fireable, fireable flags for the inference object at that time, said method further comprising the step of: (h) performing modification and execution on the fireable inference object on the basis of the fireable flags stored therein.

15. The inference processing method as set forth in claim 14, wherein step (h) comprises firing at least one rule under predetermined conditions among the rules specified by the fireable flags stored therein.

16. The inference processing method as set forth in claim 11, further comprising the steps of providing a hierarchical structure in which the rules of said knowledge base are arranged in rule groups classified according to a plurality of categories so that an inferred result obtained by applying one rule group prescribes a linkage with the next rule group, the parameters containing the information on the group and name of the rule to be matched; and referring, when the inference advances, to the group and name of the rule to be matched at that time with each of the inference objects.

17. An inference system comprising:
a knowledge base including a set of rules describing a multiplicity of inference objects, each inference object described by at least one rule, said rules stored by the inference system in a hierarchical structure in which the rules are arranged in groups classified according to a plurality of categories;
a memory storage unit including a working memory for each inference object, said working memory temporarily storing an intermediate hypothesis to be modified and executed based on the knowledge base;
a working memory selecting unit for performing reading and writing by selecting only the working memory of a presently selected inference object;
a parameter storage unit containing parameters for the inference objects, the parameters being needed when applying the rules of the knowledge base;
a parameter selecting unit for selectively reading only the parameters of the present inference object from the parameter storage unit; and
an inference engine for applying a rule of the knowledge base to the present inference object in accordance with the contents of the corresponding working memory.

18. The inference system of claim 17 wherein the inference engine configures the inference system through manipulation of the working memory selecting unit and parameter selecting unit so that a rule of the knowledge base is applied to each of the inference objects thereby enabling the parallel inference for all objects to be executed prior to the inference engine applying the next rule in the hierarchical structure to the inference objects.

19. The inference system of claim 17 wherein an inference result attained by the inference system by applying one rule of the knowledge base to a group of rules prescribes a linkage with the next rule group, and wherein the parameters stored in the parameter storage unit contain information on the rule group and name of the rule.

* * * * *

UNITED STATES PATENT AND TRADEMARK OFFICE
CERTIFICATE OF CORRECTION

PATENT NO. : 5,237,643

DATED : August 17, 1993

INVENTOR(S) : Hirokazu Kawabata and Takashi Yutani

It is certified that error appears in the above-identified patent and that said Letters Patent is hereby corrected as shown below:

At column 7, line 31, please change "fireable" to -- firable --.

Signed and Sealed this

Fifth Day of April, 1994

*Attest:*

BRUCE LEHMAN

*Attesting Officer*     *Commissioner of Patents and Trademarks*